United States Patent [19]
Takahashi

[11] 3,934,304
[45] Jan. 27, 1976

[54] SWIVEL CASTORS

[76] Inventor: Sasuke Takahashi, 34/11, Yasunakacho-6-Chome, Yao, Osaka, Japan

[22] Filed: Sept. 24, 1974

[21] Appl. No.: 509,358

[52] U.S. Cl. ................................................ 16/34
[51] Int. Cl.² ..................................... B60B 33/06
[58] Field of Search ...................... 16/29, 32, 33, 34

[56] References Cited
UNITED STATES PATENTS

| | | | |
|---|---|---|---|
| 746,636 | 12/1903 | Lawrence | 16/34 |
| 1,730,788 | 10/1929 | Simon | 16/32 |
| 2,597,213 | 5/1952 | Whiteman | 16/34 X |
| 2,779,049 | 1/1957 | Hoddevik | 16/34 |
| 3,432,878 | 3/1969 | Hupfer | 16/32 |

*Primary Examiner*—George H. Krizmanich
*Attorney, Agent, or Firm*—Wenderoth, Lind & Ponack

[57] ABSTRACT

Swivel castors being characterized by providing a supporting shaft at the lower part of the both-side supporting member of a metal fitting which is pivotally fixed to the bottom of a fixed vertical shaft, mounting said supporting shaft on one side-wall of a L-shaped supporting plate, inserting said supporting shaft into a slit which has an appropriate temporary stopping means on its both ends, pivotally supporting the L-shaped supporting plate by said supporting shaft, providing a supporting stand at the end of one side-wall of said L-shaped supporting plate, mounting a supporting shaft on the other side-wall of the L-shaped supporting plate so as to support a rotary wheel, and when the L-shaped supporting plate turns in such direction as the end of one side-wall of the plate is raised and the supporting stand fixed thereto is stopped by an internal stopping edge of the metal fitting and thus the rotary wheel alone comes into contact with the ground, letting the metal fitting and the rotary wheel turn freely and thus making it possible to move a table or the like freely, and on the contrary, when the L-shaped supporting plate turns in such direction as said end of the side-wall of the plate is brought down and both the supporting stand attached thereto and the rotary wheel touch the ground at one time, stopping the movement of the metal fitting and the rotary wheel perfectly and thus making it possible to stop the movement of a table or the like perfectly.

4 Claims, 10 Drawing Figures

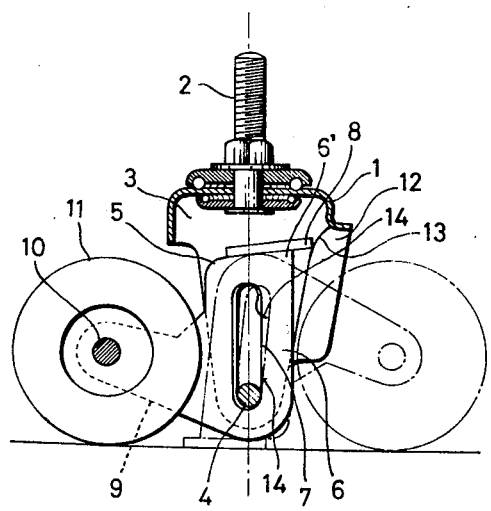
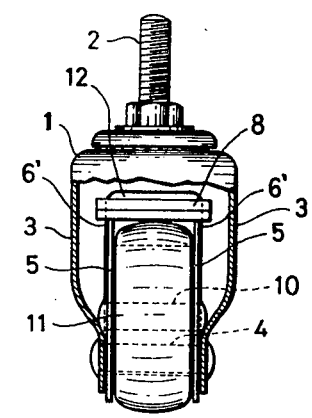
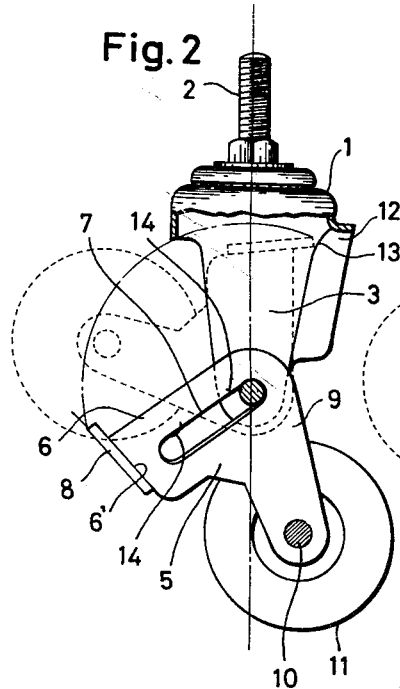
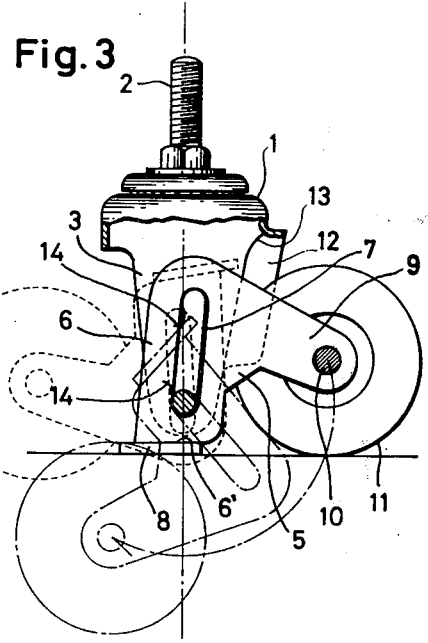

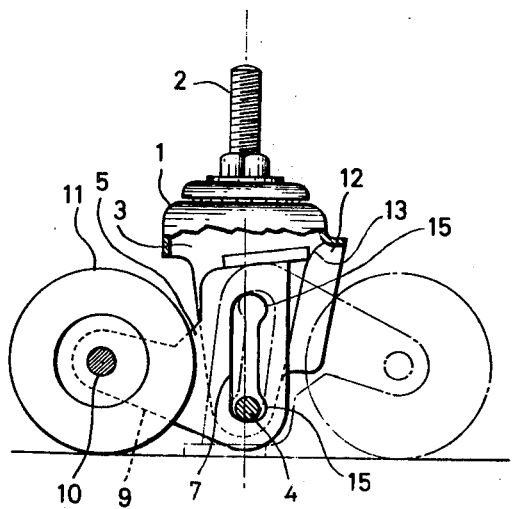
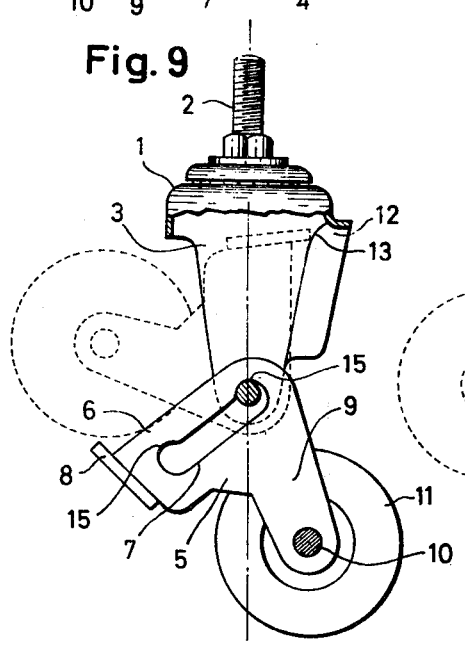
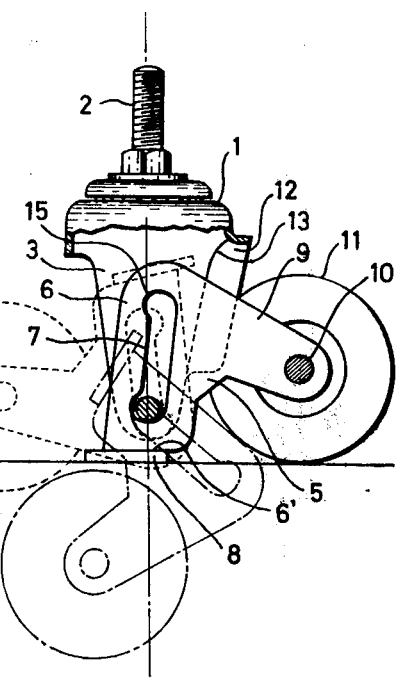

SWIVEL CASTORS

The invention relates to swivel castors.

Conventional swivel castors which have been used for moving and stopping a movable table or a carrying stand (which is generally called a wagon) can only stop the rotation of a wheel. However, the wheel may have other movement such as horizontal turning with the point of contact between the wheel and the ground as a center and therefore, even if the rotation of the wheel can be stopped, the table or stand itself cannot be stopped perfectly due to the horizontal turning of the pivotally fixed metal fitting which supports the wheel. This often causes troubles.

The present invention has eliminated such defect as above. It has an special feature in that, by a single operation of lifting one side of a table or a stand a little and then placing it on the ground again, an L-shaped supporting plate, which is pivotally supported by a supporting shaft provided on the lower part of a metal fitting pivotally fixed to the end of a fixed vertical shaft fixed to the lower side of a leg or a stand of a table or a stand, is turned over alternately in opposite directions along within a slit provided on said L-shaped supporting plate, and a supporting stand provided on one end of the L-shaped supporting plate is made to touch or leave the ground. This way, both the rotation of a wheel and the horizontal turning of the metal fitting can be stopped completely at one time.

The invention will now be described with particular references to the accompanying drawings, in which:

FIG. 1 & FIG. 8 are respectively a vertical sectional elevation at the time when the rotary wheel and the metal fitting of the apparatus in accordance with the present invention are made to turn freely;

FIG. 2 & FIG. 9 are respectively an elevation with a partial vertical section which shows the process for stopping the movement of both the rotary wheel and the metal fitting;

FIG. 3 & FIG. 10 are respectively an elevation with a partial vertical section at the time when the movement of both the rotary wheel and the metal fitting is perfectly stopped;

FIG. 4 is a left side view of FIG. 1, but with a partial vertical section;

Figure 5:
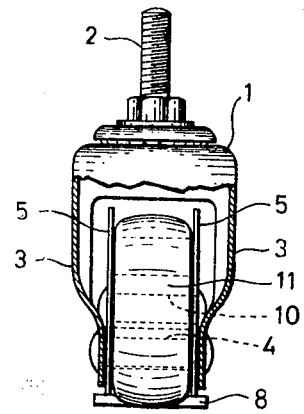
FIG. 5 is a right side view of FIG. 3, but with a partial vertical section.
Figure 6:
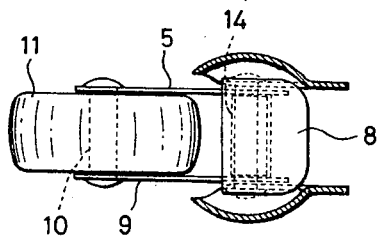
FIG. 6 is a plain view of FIG. 1, but with a partial horizontal section.
Figure 7:
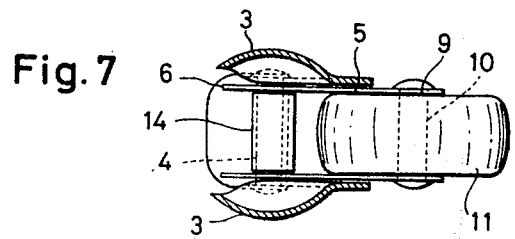
FIG. 7 is a plain view of FIG. 3, but with a partial horizontal section.

A metal fitting 1 is pivotally fixed to the end of a leg of a table or the like or to the end of a fixed vertical shaft 2 which is fixed to the lower surface of a stand, not shown in the drawings. A supporting shaft 4 is provided at the lower end of both-side supporting parts 3, 3 of said metal fitting 1 and is inserted into two slits 7, 7 provided on walls 6, 6 of L-shaped plates 5, 5 and which have an appropriate temporary stopping means like a spring plate holder 14 or an indent 15. Thus, said supporting shaft 4 supports the L-shaped supporting plates 5, 5. A supporting stand 8 is provided at the lower ends 6', 6' of the walls 6, 6, while a supporting shaft 10 is provided at the lower ends of other walls 9, 9 and supports a rotary wheel 11.

When the L-shaped supporting plates 5, 5 turning the same direction as the ends 6', 6' of the walls 6, 6 are raised, both sides of the top of the supporting stand 8 are stopped by a stopping edge 13 inside an open part 12 of the metal fitting 1, and the rotary wheel 11 alone comes into contact with the ground. Thus, it is possible to move a table or the like freely by letting both the metal fitting 1 and the rotary wheel 11 turn freely.

On the other hand, when the L-shaped supporting plates 5, 5 turning in the same direction as the ends 6', 6' of the walls 6, 6 are brought down, both the supporting stand 8 and the rotary wheel 11 come into contact with the ground. Thus, it is possible to stop the movement of a table or the like perfectly by stopping both the horizontal turning of the metal fitting 1 and the rotation of the rotary wheel 11.

The apparatus necessary to move and stop a free wheel in accordance with the present invention has the same structure as above. Therefore, when a table or the like which is not shown in the drawing is lifted a little, the rotary wheel 11 alone comes into contact with the ground as shown in FIG. 1 & FIG. 8 and the ends 6', 6' of the side-walls 6, 6 of the L-shaped supporting plates 5, 5 are raised by the weight of the table or the like. Further, both sides of the top of the supporting stand 8 are stopped by the stopping edge 13 inside an open part 12 of the metal fitting 1. In this state, the height of the supporting shaft 4 at the lower end of the both-side supporting parts 3, 3 of the metal fitting is slightly lower than the height of the supporting shaft 10 of the rotary wheel 11, and further, the load of the table or the like is given thereto. Thus, it is possible to carry out free rotation of the wheel 11 and free horizontal turning of the metal fitting 1.

A contrary operation to the above, too, can be carried out as follows. When the table or the like is lifted a little, the supporting shaft 4 situated inside the slits 7, 7 in the walls 9, 9 of the L-shaped supporting plates 5, 5, tends to go upward along the slits 7, 7. But, under the weight of the L-shaped supporting plates 5, 5 alone, the hook by the temporary stopping means (e.g. a spring plate holder 14 or an indent 15) cannot be released and both the L-shaped supporting plates 5, 5 and the rotary wheel 11 are held in suspension. At the same time, the center of gravity of the L-shaped supporting plates 5, 5 is biased to a position which is always higher than the fulcrum of the supporting shaft 4. Accordingly, the L-shaped supporting plates 5, 5 are rotated and the fulcrum of the rotary wheel 11 moves to the opposite side, going over the perpendicular line of the fulcrum of the supporting shaft 4 (cf. FIG. 2 & FIG. 9). At the moment when the table or the like is placed on the ground, the rotary wheel 11 touches the ground and is raised, and at the same time, the supporting stand 8 comes down to touch the ground. When both the rotary wheel 11 and the supporting stand 8 touch the ground, the supporting shaft 4 bearing the load of the table or the like releases the temporary stopping means due to said load and is pressed down to the lower end of the slits 7, 7 (in such a state as shown in FIG. 3 & FIG. 10 with real lines.) Thus, it presses the supporting stand 8 and the rotary wheel 11 perfectly onto the ground and stops both the rotation of the wheel 11 and the horizontal turning of the metal fitting 1 strongly at one time.

Then, if the same operation of lifting the table or the like once and placing it on the ground again as already stated is repeated, the rotary wheel 11 is suspended and, due to the same principle as stated before, it presents such condition as explained with reference to FIG. 1 & FIG. 8. Accordingly, it becomes possible to carry out both the rotation of the wheel 11 and the horizontal turning of the metal fitting 1 freely at one time.

As seen from the foregoing description, the present invention has a great significance in many respects in that, by a very simple operation, both the rotation of the wheel and the horizontal turning of the metal can be stopped securely at one time and eventually it can hold a table or the like perfectly at a standstill, and it is simple in structure and never goes wrong.

What I claim is:

1. A locking swivel castor for attachment to the leg of a table or to the bottom of a like item having a rotary wheel in contact with the surface beneath the object being upheld, said castor comprising:

slotted L-shaped support means connected to said rotary wheel for rotatably supporting said wheel and locking said castor into position, said support means having:
  a first portion of the L-shape,
  a first shaft fitted through said first portion at the end opposite the angle of the L-shape for rotatably supporting said wheel,
  a second portion of the said L-shaped angled from said first portion, said second portion having a longitudinal slot running therethrough from the angle between the two portions toward the tip of the second portion, and
  a support stand fixed to the end of said second portion opposite the angle formed by the first and second portions for resting against the surface beneath the item being upheld when the angle formed by the first and second portions is directed upward, whereby the castor is locked into position and is not free to move; and swivel framing means attached to the bottom of the item being upheld for swiveling and vertically adjusting said L-shape support means, said framing means having:
  a second shaft stationarily fixed at the bottom thereof and loosely fitted through the slot in the second portion of said support means, whereby the second portion can slide along and rotate about the second shaft,
  stopping plate means fitted therein for abutting against the support stand when the second portion of the L-shape and the support stand attached thereto are rotated about the second shaft and the angle formed by the first and second portions is directed downward, whereby rotating the second portion and the support stand about the second shaft away from the locking position toward the stop plate means causes the slot in the first portion to slide along the second shaft and the support stand to abut against the stop means, thereby lifting the support stand away from the surface and unlocking the swivel for free rotation.

2. A locking swivel castor as claimed in claim 1 wherein said support frame means further has a temporary stopping means at each end of said slot in said second portion for temporarily securing the support means around the second shaft means.

3. A locking swivel castor as claimed in claim 2 wherein said temporary stopping means is comprised of a spring plate holder fitted into the slot in said second portion for pressing against the second shaft.

4. A locking swivel castor as claimed in claim 2 wherein the slot in the second portion has indentations in the ends thereof for holding the second shaft.

* * * * *